June 23, 1936.  H. H. TIMKEN  2,044,924
PROCESS OF MAKING BRAKE DRUMS
Filed Jan. 5, 1934  2 Sheets-Sheet 1
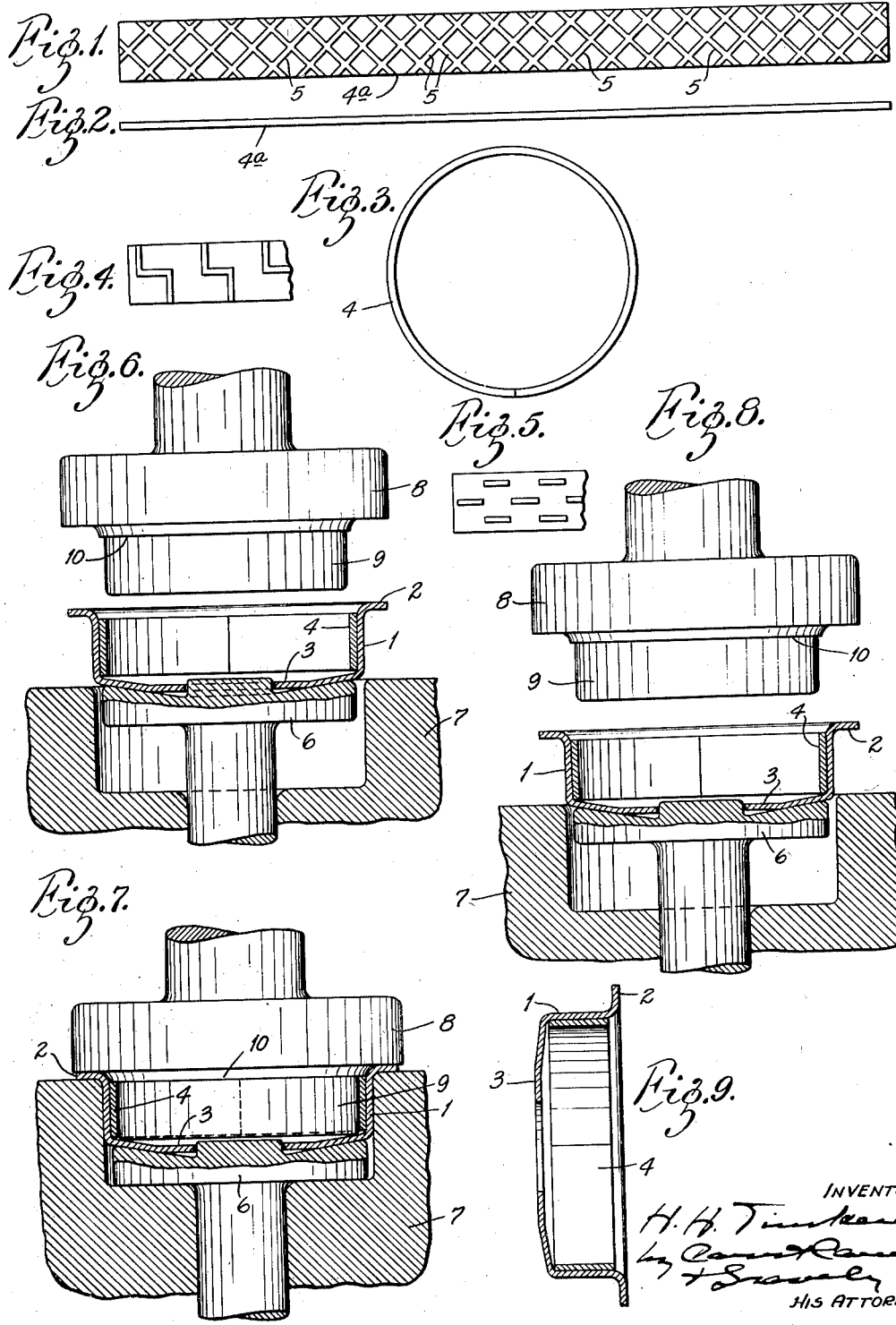

June 23, 1936.  H. H. TIMKEN  2,044,924
PROCESS OF MAKING BRAKE DRUMS
Filed Jan. 5, 1934   2 Sheets-Sheet 2
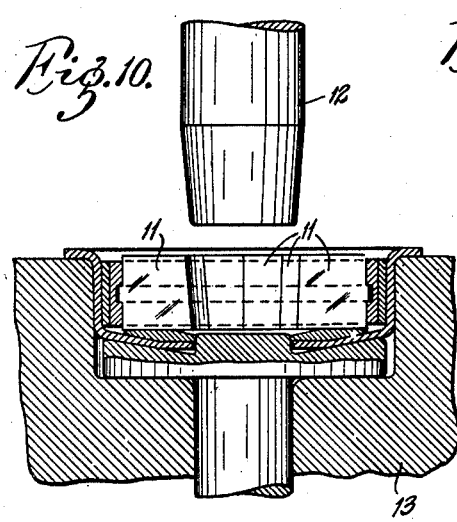
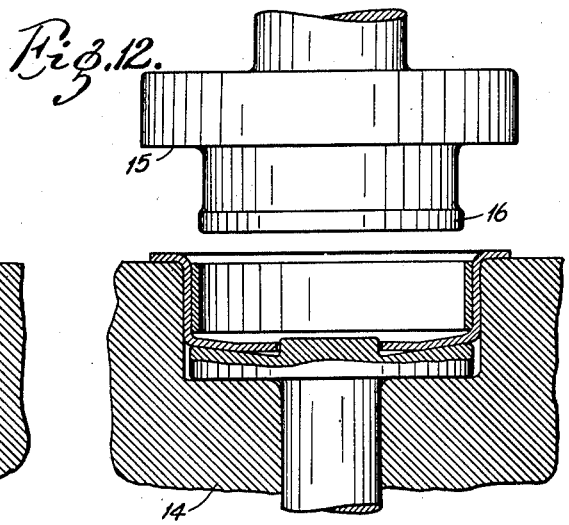
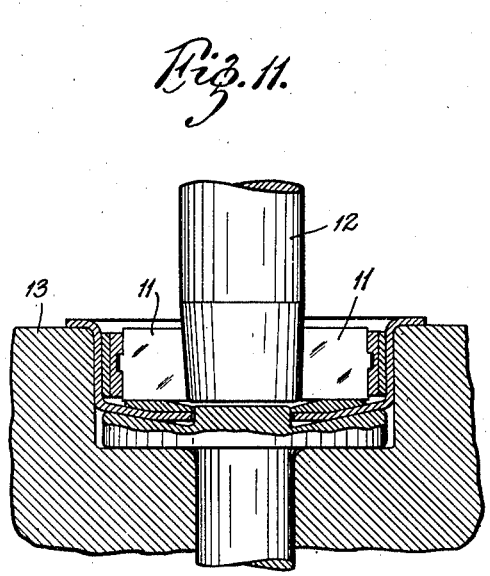
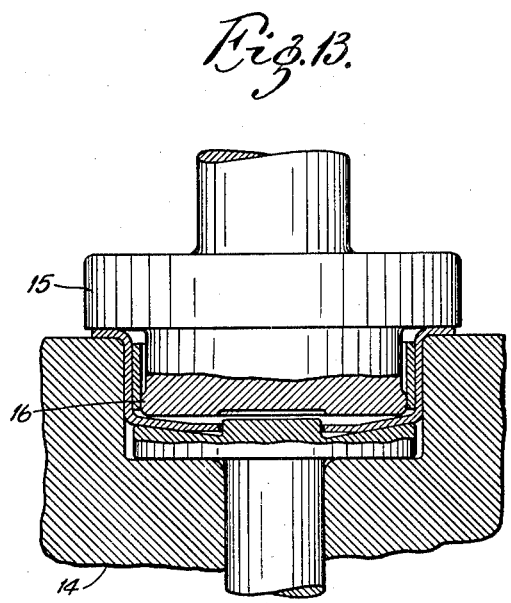
INVENTOR:
H. H. Timken
HIS ATTORNEYS Patented June 23, 1936

2,044,924

UNITED STATES PATENT OFFICE 2,044,924

PROCESS OF MAKING BRAKE DRUMS

Henry H. Timken, Canton, Ohio, assignor to The Timken Roller Bearing Company, Canton, Ohio, a corporation of Ohio Application January 5, 1934, Serial No. 705,326

8 Claims. (Cl. 29—152.2)

This invention relates to brake drums, especially brake drums of the type wherein the body member has a separate liner applied thereto to provide the braking surface. The principal object of the present invention is to devise a new process of manufacture by which the liner may be applied to the body of the brake drum efficiently and economically.

The invention consists principally in placing the liner ring in proper longitudinal position inside the body member of the brake drum and then contracting the circumference of said body member or expanding the circumference of said liner ring to effectually engage them together. It also consists in the operations and combinations hereinafter set forth.

In the accompanying drawings, wherein like reference numerals refer to like parts wherever they occur,—

Fig. 1 is a face view of the strip from which the liner is formed, showing the face that contacts with the brake drum, Fig. 2 is an edge view of the strip;

Fig. 3 is an edge view of the liner ready for insertion in the unfinished brake drum;

Figs. 4 and 5 are fragmentary views similar to Fig. 1 showing the bonding ribs arranged in other patterns, Figs. 6, 7 and 8 are sectional views showing the steps in the process of securing the brake drum and liner together;

Fig. 9 is a sectional view of the finished brake drum and liner;

Figs. 10 and 11 are sectional views showing a modified process of securing the brake drum and liner together; and Figs. 12 and 13 are similar views illustrating another modified process of securing the brake drum and liner together.

The brake drum shown in Fig. 9 comprises a body member in the form of a cylindrical shell 1 with an outturned annular flange 2 at one end and a wide inturned flange 3 at the other end. Inside of the cylindrical shell 1 is a cylindrical liner 4 that is firmly secured thereto.

The body member 1 of the brake drum is preferably pressed from a single piece of sheet steel of the kind commonly used for brake drums. The liner 4, however, is preferably made out of a rolled strip 4a of steel or other metal having properties particularly adapted to resist wear and scoring. Preferably one surface of the liner strip is provided with two series of low, narrow ribs 5, which are disposed obliquely with relation to the side edges of the liner with the ribs of one series intersecting the ribs of the other series at a right angle. The ribs need not extend more than approximately ten thousandths (.010) of an inch above the surface of the relatively large lands or areas intervening or enclosed thereby.

In the manufacture of my brake drum, the body member 1 thereof is pressed up to approximately its final shape and with the diameter of its drum about thirty thousandths (.030) of an inch above the final diameter thereof. Then the liner strip 4, bent into ring-shape with its ends welded or otherwise secured together and of proper size to fit snugly or freely in the body members, is placed inside the body member in the longitudinal position it is to occupy in the completed structure.

According to Figs. 6, 7 and 8, the parts thus loosely assembled are set on the stripper 6 of a drawing die 7 whose inside diameter is about thirty thousandths (.030) of an inch less than that of the preformed body member. Thereupon the assembly is forced into the die by means of a shouldered ram 8 whose forwardly extending portion 9 enters the liner 4, fitting therein sufficiently snugly to back up the liner and prevent buckling thereof under the stress of the drawing operation. The ram 8 is also provided with a shoulder 10 in position to bear against the outwardly extending flange 2 of the body member 1 of the brake drum. Thus, when the ram 8 moves forward, it forces the body member 1 endwise into the die 7 and thereby causes a contraction of the diameter of said body member by the plastic flow of the metal thereof. As the portion 9 of the ram inside of the liner 4 backs it up and thereby prevents inward radial movement thereof, the low ribs 5 on the surface of the liner oppose resistance to the inward plastic flow of the metal of the body portion and thus force such metal to flow past such ribs into the shallow spaces between them and into frictional engagement with the lands or areas of the liner 4 between the ribs 5 thereof. Consequently the liner and the body member are very effectively locked together frictionally and mechanically.

It is noted that, by reason of their obliquity, the ribs 5 of Fig. 1 mechanically bond the body and liner together against displacement either circumferentially or in an axial direction, and that said ribs are wide enough to offer considerable resistance to the shearing stress occasioned by braking action. The bonding ribs may be arranged in other patterns, as shown, for instance, in Fig. 4 or may be reduced to short areas extended above the general lands, as shown in Fig.

5. It is preferable, however, to have the ribs extend to the edge of the liner so as to increase its resistance to any tendency to curl away from the body member. Obviously, the bonding ribs may be formed on the body member instead of the liner, and shallow grooves may be used in lieu of ribs.

In the process above described, the body member and the liner are frictionally and mechanically bonded together by plastic flow of metal due to radial pressure applied after the parts are freely fitted together. According to the foregoing description, such plastic flow of metal is caused by forcing the assembled parts into a drawing die to reduce the diameter of the body member of the drum while the liner is firmly backed by the ram. Other ways of effecting such plastic flow of metal are illustrated in Figs. 10 to 13 wherein the assembly is seated and backed firmly in the die and the pressure is applied to the liner to expand it into frictional and mechanical bonding engagement with the body member.

According to Figs. 10 and 11, an expanding punch is used for enlarging the liner. This punch comprises a ring of radial moveable blocks II with concentric inner and outer surfaces, the inner surfaces being tapered for cooperation with an axially moveable tapered ram 12. When power is applied to said ram, it forces the die blocks radially outward with sufficient pressure to enlarge the liner into frictional contact with the body member in the die 13 and cause the plastic flow of metal requisite for the mechanical bonding of the parts together. Such flow may be caused in either or both the liner and the body according to their relative plasticities.

According to Figs. 12 and 13, the loosely assembled body member and liner are set in a close fitting die 14 and then the liner is expanded against the body member by an axially moveable punch 15 with an enlarged head 16 in the form of a rib with a longitudinally convex surface. The front end of such head is small enough to enter the liner freely and the wider portion of the head is so wide that, when it is forced axially into the liner, it acts after the manner of a wedge to increase the diameter of the liner. It is noted that, by reason of the longitudinal convexity of the punch head, the radial pressure which causes the plastic flow of metal is localized in a rather narrow circumferential zone which progresses from the outer end of the liner to the inner end thereof as the head moves forward. This action both expands and "irons" it with a longitudinal rubbing thereon.

From the foregoing, it is obvious that the brake drum hereinbefore described is light, strong, efficient, smooth wearing, durable and very easy and economical to manufacture. As the duplex construction of my brake buts one member in compression and the other in tension, vibration is dampened and the construction is more quiet in operation. It also permits the drum and the liner to be made of different materials, each particularly adapted to withstand the stresses and wear to which that part is subjected in service. The process of manufacture is unusually simple, as the body member can be preformed very easily to the required initial shape and size by the simple operation of die-pressing, and the liner is merely a section of a rolled strip cut to length and curved into the form of a ring with its ends welded together. The assembly of these two simple and easily made parts is effected by the single operation of contracting the diameter of the body member by a single stroke of a suitable drawing die, thereby dispensing with the necessity of resorting to welding or mechanical devices for securing the parts together, although they may be welded or otherwise fastened, if desired.

The above assembling process results in a duplex brake drum construction which is accurate as to size and roundness and wherein the liner is firmly locked to the drum and has a working surface that is free from roughness.

No claim is made herein to the brake drum above described as it constitutes the subject matter of my copending application for patent Serial No. 719,665 filed April 9, 1934.

I do not wish to be limited to the details hereinbefore described.

What I claim is:

1. The process of making lined brake drums which comprises pressing a sheet of steel into the form of a cylindrical shell with an outturned annular flange at one end and an inturned annular flange at the other end, fitting a rolled steel liner member in the shell portion thereof, said liner member having rolled in its engaging surface areas of slightly different thickness from the lands adjacent thereto in axial and circumferential directions and then tightly engaging said members together by a drawing operation whereby radial pressure is applied to one of said members throughout its entire circumference at one time sufficient to cause plastic flow of the metal, the entire flow producing pressure being radial.

2. Process of making lined brake drums which consists in placing the liner in proper longitudinal position inside the drum and then applying steady pressure in radial direction to one of them continuously throughout its circumference at the same time, the whole of the pressure acting radially and being sufficient to plastically flow the metal to effect engagement of the parts.

3. Process of making lined brake drums which comprises pressing a sheet of steel into the form of a cylindrical shell with an outturned annular flange at one end and an inturned annular flange at the other end, rolling the liner member with areas raised about one hundredth of an inch above its adjacent lands and of sufficient width to have considerable resistance to shearing, fitting the liner member in proper longitudinal position inside the shell, then expanding said liner member into frictional and interlocking engagement with said shell throughout the circumferential surface of said ring at the same time, the expansion of said ring being effected by steady pressure, all of which is applied radially and directly to the whole inner surface of the ring at the same time.

4. The process of making lined brake drums which comprises pressing a sheet of steel into the form of a cylindrical shell with an outturned annular flange at one end and an inturned annular flange at the other end, placing a liner ring in proper longitudinal position inside the shell and then expanding said ring into frictional engagement with said shell throughout the circumferential surface of said ring, the expansion of said ring being effected by steady pressure applied directly and radially to an entire circumferential zone at the outer edge of the ring and progressing continuously to the inner edge thereof.

5. The process of making lined brake drums which comprises pressing a sheet of steel into the form of a cylindrical shell with an outturned annular flange at one end and an inturned annular flange at the other end, said shell being slightly oversize, fitting in said shell a liner strip curved into a ring, and then die-drawing said shell to reduce its diameter to desired size and thereby firmly engage said strip.

6. The process of making lined brake drums which comprises pressing a sheet of steel into the form of a cylindrical shell with an outturned annular flange at one end and an inturned annular flange at the other end, said shell being slightly oversize, fitting in said shell a liner strip which is curved into a ring and is provided in its drum engaging surface with bands of different thickness from the intervening lands, and then die-drawing said shell to plastically reduce its diameter and mechanically interlock said shell and said liner.

7. The process of making lined brake drums which comprises pressing a sheet of steel into the form of a cylindrical shell with an outturned annular flange at one end and an inturned annular flange at the other end, placing in proper longitudinal position inside the drum member a liner ring whose outer surface has slightly raised areas rolled thereon of sufficient width to oppose considerable resistance to shearing, and then pressing one of them with steady pressure applied radially throughout its entire circumference at the same time to effect frictional and mechanical bonding of said drum member and said liner, the entire pressure thereon being applied radially.

8. The process of making lined brake drums which comprises pressing a sheet of steel into the form of a cylindrical shell with an outturned annular flange at one end and an inturned annular flange at the other end, placing a liner ring in proper longitudinal position inside the shell and then expanding said ring into frictional engagement with said body member throughout the circumferential surface of said ring, the expansion of said ring being effected by steady pressure, all of which is applied radially and directly to the whole inner surface of the ring at the same time.

HENRY H. TIMKEN.